United States Patent
Zakovic et al.

(10) Patent No.: US 6,736,455 B1
(45) Date of Patent: May 18, 2004

(54) DUAL AIR BAG AND CROSSBAR CHILD SAFETY SEAT

(76) Inventors: John Zakovic, 64-16 62nd Ave., Middle Village, NY (US) 11379; Rose A. Zakovic, 64-16 62nd Ave., Middle Village, NY (US) 11379

( * ) Notice: Subject to any disclaimer, the term of this patent is extended or adjusted under 35 U.S.C. 154(b) by 0 days.

(21) Appl. No.: 10/388,282

(22) Filed: Mar. 13, 2003

(51) Int. Cl.[7] ................................................. A47C 1/08
(52) U.S. Cl. ................... 297/256.15; 297/488
(58) Field of Search ...................... 297/256.15, 250.1, 297/DIG. 3, 216.1, 216.11, 487, 488; 280/728.1

(56) References Cited

U.S. PATENT DOCUMENTS

| | | | |
|---|---|---|---|
| 4,834,420 A | 5/1989 | Sankrithi et al. | |
| 5,390,952 A | 2/1995 | Goor | |
| 5,492,361 A | * 2/1996 | Kim | |
| 5,511,850 A | 4/1996 | Coursey | |
| 5,556,162 A | * 9/1996 | Raffini | |
| 5,653,501 A | 8/1997 | Goor | |
| 5,720,519 A | 2/1998 | Barnes | |
| 5,775,771 A | 7/1998 | La Cour et al. | |
| 5,779,304 A | 7/1998 | Cunningham | |
| 5,833,311 A | 11/1998 | Friedrich et al. | |
| D458,042 S | 6/2002 | Zakovic et al. | |

* cited by examiner

*Primary Examiner*—Milton Nelson, Jr.
(74) *Attorney, Agent, or Firm*—Gerald M. Walsh; Kenneth M. Bush; Bush IP Law Group, LLC

(57) ABSTRACT

A child safety car-seat having an upper and a lower safety crossbar, with each crossbar having an air bag. The air bags deploy outward from the crossbars when activated in order to avoid injury to the child in the car-seat when the air bags fill with gas. The position of the air bags and the crossbars helps prevent injury to the head, face, neck, chest, and abdomen of the child during an automobile collision.

11 Claims, 4 Drawing Sheets

DUAL AIR BAG AND CROSSBAR CHILD SAFETY SEAT

BACKGROUND OF THE INVENTION

1. Field of the Invention

This invention relates, in general, to child safety seats, and, in particular, to a child safety seat with dual safety crossbars having air bags that deploy outward, away from the child.

2. Technical Background

A variety of child safety car-seats are known. These car-seats are usually secured in a car by one of the car's adult seat belts. The car-seat has restraining safety belts which are placed around the child to protect the child in the event of an automobile accident. However, these belts have limited utility because they cannot be applied tightly without unduly restraining the child and without producing significant discomfort and irritation to the child. Further protection can be provided to the child by adding a safety crossbar. These crossbars have the drawback of concentrating the impact and force of a collision to the specific body area of the child where the child makes contact with the crossbar during the collision. Thus, although the crossbar does not unduly restrict a child and will effectively keep a child within the car-seat, it creates a risk of injury to the child during impact.

Another means for protecting a child in a car-seat is to include one or more airbags in the car-seat. Air bags are well-known to protect adults during an automobile collision, and child safety car-seats have been designed to provide similar protection. Most of these air bag systems project the air bag into the child during deployment. Because of the relative instantaneous and explosive nature of air bag inflation during a collision, there is considerable fear and risk that these air bags can injure or smother a child during deployment.

Air bags attached to a single safety crossbar on the car-seat have been disclosed, but these air bags are excessively flexible and provide limited restriction of forward movement of the head during a collision. This creates a serious drawback because the comparatively heavy head of a child is readily thrown forward during a head-on collision, subjecting the cervical vertebra to high loads and stress.

SUMMARY OF THE INVENTION

The present invention is a child safety car-seat which has upper and a lower safety crossbars. Each crossbar contains an air bag which will be released and filled with gas in the event of an automobile collision. The air bags deploy and inflate outward from the crossbars, away from the seat and its child occupant, as the air bags fill with gas. A portion of the air bag also engulfs the crossbar. If the child is thrown forward, the child's forward motion is prevented as the child makes contact with the airbags and crossbars. A majority of the force of impact is absorbed by the airbags and the child's head is protected from being thrown forward.

An advantage of the present invention is an air bag system that does not deploy towards the child.

Another advantage of the present invention is an air bag system that will not smother the child during deployment.

Another advantage of the present invention is an air bag system that protects a child from flying debris resulting from an automobile accident.

Another advantage of the present invention is a simple air bag system for a child safety car-seat that is easy to construct and which can be activated by the car's existing sensor and power system.

DETAILED DESCRIPTION OF THE PREFERRED EMBODIMENTS

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
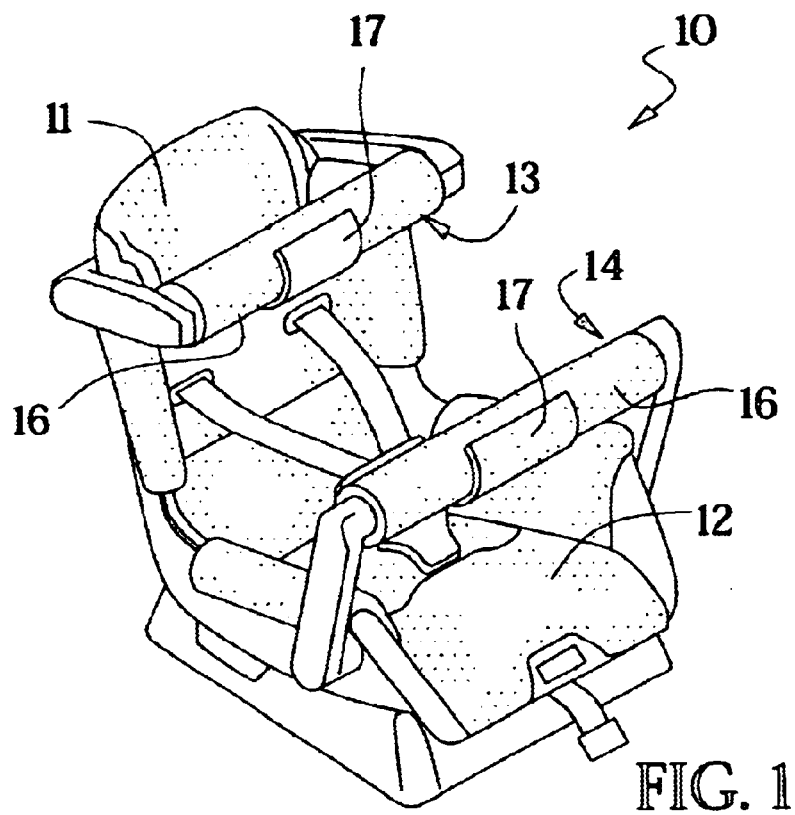
FIG. 1 shows a frontal view of the child safety car-seat with the air bags undeployed within the safety crossbars.
Figure 2:
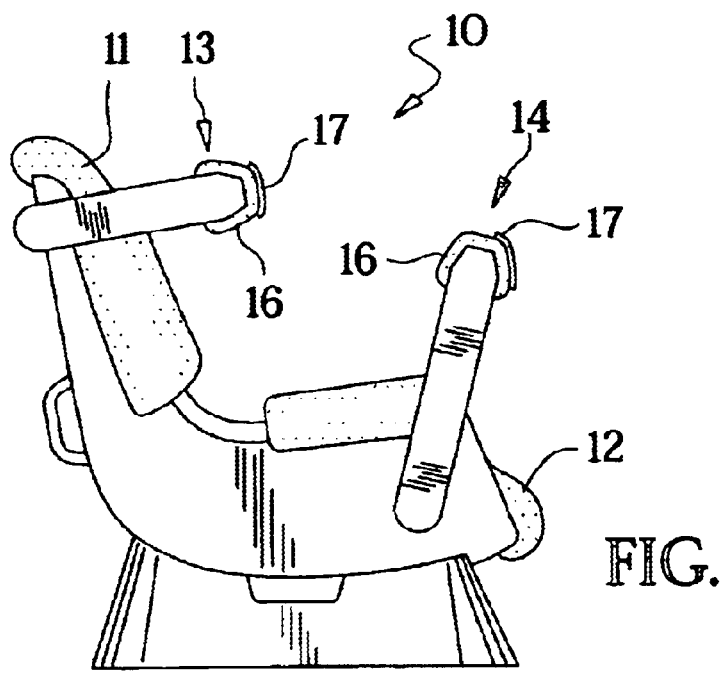
FIG. 2 shows a side view of the child safety car-seat with the air bags undeployed within the safety crossbars.

FIG. 1 shows a frontal view of the child safety car-seat 10 of the present invention which has a back portion 11 and a seat portion 12. An upper crossbar 13 is rotatably attached to back portion 11 and is positioned approximately at the level of the upper chest of the child when the child is in car-seat 10. A lower crossbar 14 is rotatably attached to seat portion 12 and is positioned approximately at the level of the middle abdomen of the child when the child is in car-seat 10. Upper crossbar 13 can articulate upward and downward; and lower crossbar 14 can articulate forward or backward, to accommodate the seating and removal of a child from car-seat 10. Crossbars 13 and 14 can be reversibly locked into position after the child has been seated. Car-seat 10 can be anchored to the seat of a car by the usual means, for example, by use of the car's existing seat belts. Crossbars 13 and 14 have a padded portion 16 and an air bag compartment 21 (see FIGS. 5 and 6) centrally displaced within padded portion 16, covered by flap 17, and with compartment 21 and flap 17 facing outwards, away from back portion 11. FIG. 2 shows a side view of car-seat 10 with air bags undeployed.

Figure 3:
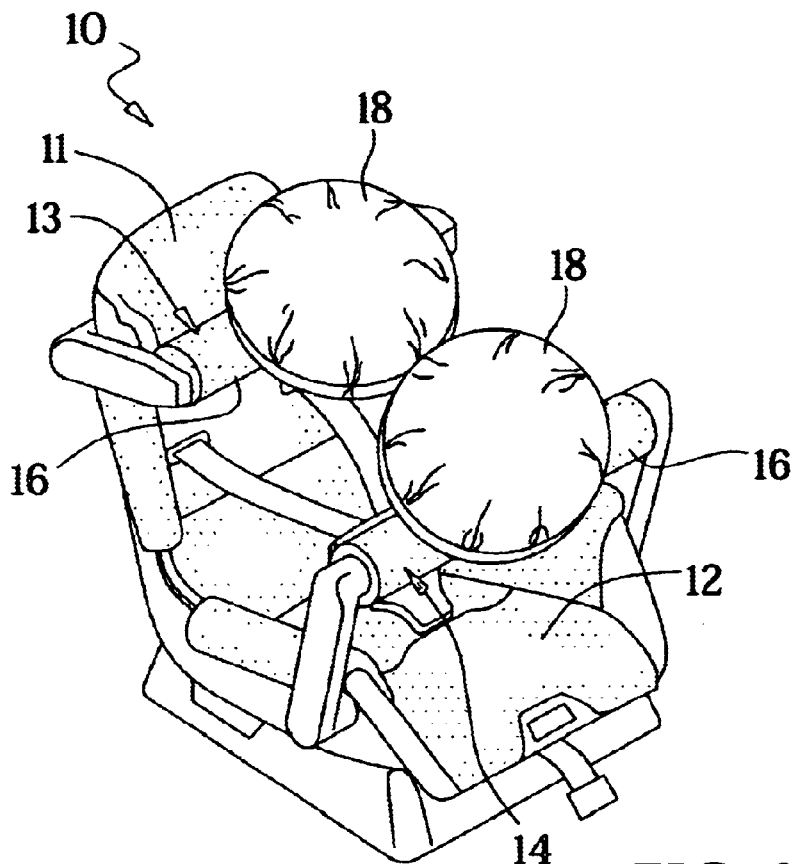
FIG. 3 shows a frontal view of the child safety car-seat with the air bags deployed outward from the safety crossbars.
Figure 4:
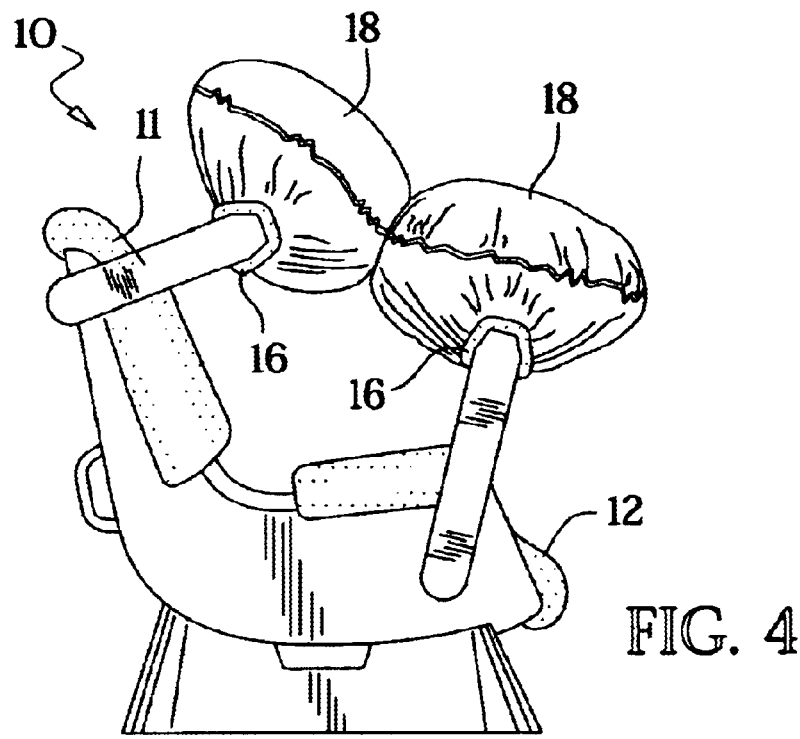
FIG. 4 shows a side view of the child safety car-seat with the air bags deployed outward form the safety crossbars.

FIG. 3 shows a frontal view of car-seat 10 with air bags 18 deployed and filled with gas. FIG. 4 shows a side view of car-seat 10 with airbags 18 deployed. FIG. 4 illustrates how air bags 18 are deployed outward, away from back portion 11 when they are activated and filled with gas.

Figure 5:
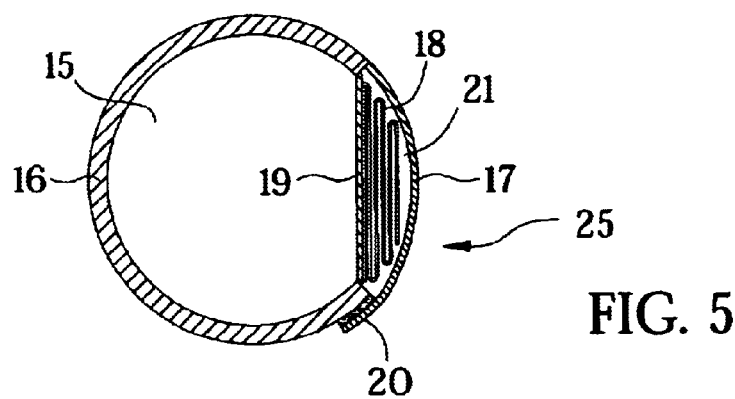
FIG. 5 shows a detailed side view of the air bag in the undeployed position in the padding of the safety crossbar.

FIG. 5 illustrates a more detailed crossectional side view of the crossbar (13 or 14) with the air bag 18 in an undeployed collapsed state. Air bag 18 is attached to the solid portion 15 of the crossbar at attachment point 19 on the outer aspect 25 of the crossbar. Air bag 18 is folded in compartment 21 within padded portion 16 of the crossbar and is held in place by flap 17. A hook and pile arrangement 20, such as, for example, Velcro, can be used on flap 17 and padded portion 16 to keep flap 17 closed in place over air bag 18 by attaching reversibly to padded portion 16. Other types of connecting devices could be used such as snaps and adhesives know in the art.

Figure 6:
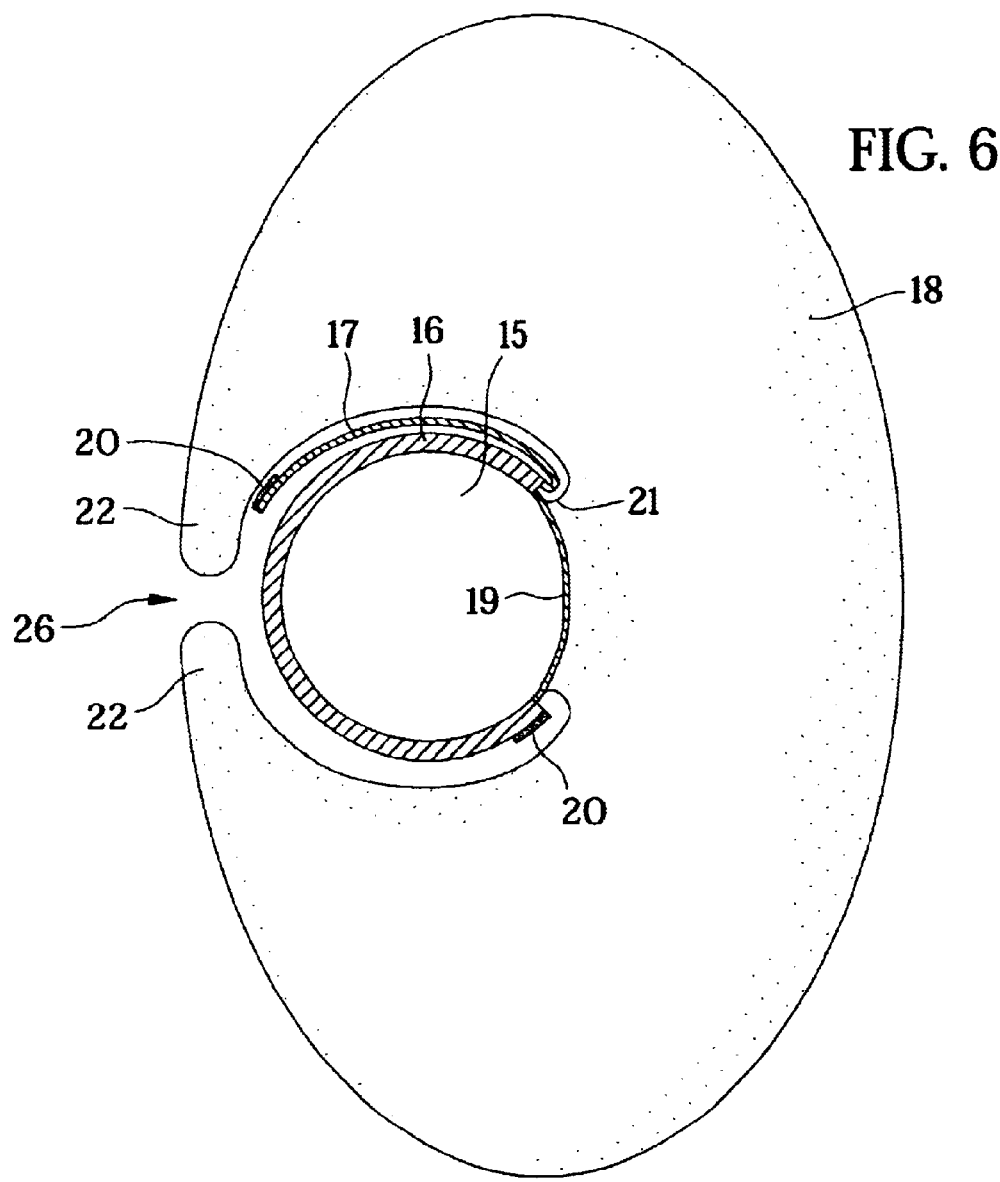
FIG. 6 shows a detailed side view of the air bag in the deployed position, filled with gas.

FIG. 6 illustrates a more detailed cross-sectional side view of the crossbar (13 or 14) with the air bag 18 in the deployed position, filled with gas. As air bag 18 is filled with gas and begins to expand, hook and pile arrangement 20 is constructed so that flap 17 will detach from padded portion 16 and air bag 18 will rapidly deploy from compartment 21. Air bag 18 is constructed in shape so that it will expand outward, away from back portion 11 and seat portion 12 of car-seat 10, but a portion 22 of air bag 18 will engulf the inner aspect 26 of the crossbar to provide further cushioning of the portion 26 of the crossbar facing the child in car-seat 10. When air bag 18 is fully expanded with gas, each crossbar is positioned approximately in the center region of air bag 18. Air bag 18, consequently, is distributed approximately evenly above and below each crossbar as illustrated in FIG. 6. Thus, when air bag 18 on upper crossbar 13 is deployed it will protect the head, face, neck, and chest of the child. When air bag 18 on lower crossbar 14 is deployed it will protect the upper and lower abdomen of the child. Air bags 18 can be left inflated and can be deflated manually through a valve when desired; In this way air bags 18 can remain inflated throughout the duration of the collision and help prevent the child from being struck by flying debris.

Figure 7:
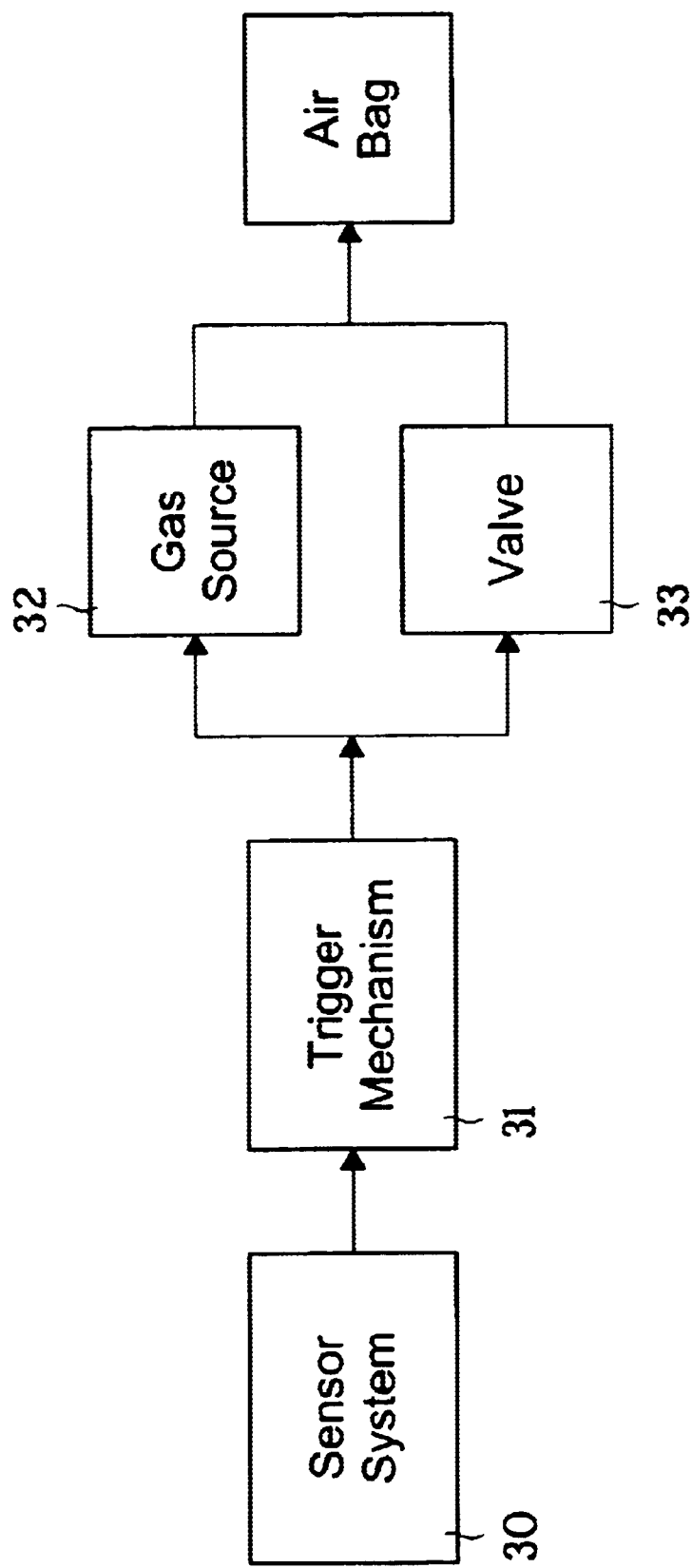
FIG. 7 illustrates a system suitable for activating the airbags of the present invention during an automobile collision.

Air bag 18 can be constructed of any suitable material, preferably the same type of material used in airbags in the steering wheels of ordinary cars for adult passengers. The air bag 18 can be deployed in various ways. For example, air bag 18 can be connected with tubing directly to the car's internal air bag deployment system by means well known in the art so that the air bags 18 in the child's car-seat 10 would be deployed by the car's internal system during a collision. Alternatively, air bags 18 could be filled with a self-contained gas supply shown, by way of example, in FIG. 7. A sensor system 30 can use the existing sensors on the car or can be included separately on the child's car-seat 10, for example, contact sensors, pressure sensors, and/or accelerometers, and the like. Signals from these sensors generated, for example, by a collision, can activate a trigger mechanism 31 which releases gas 32 from a canister or generates gas 32 chemically. Trigger mechanism 31 can also regulate a valve 33 between gas source 32 and air bag 18 to ensure proper rate of inflation of air bag 18. A detailed explanation of the air bag triggering and inflation system is not considered essential because the technology is well-developed for use in automobiles and is easily adapted for use in connection with the present invention, within the skill of the relevant art.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the air bag system can be used in any size and type of child's safety car-seat. The safety crossbars can be constructed of any suitable material, such as, for example, plastic, metal, and the like. The safety crossbar can be hollow and can house the gas source, valves, trigger mechanisms, and related electronics. The gas source can include a canister charged with nitrogen, carbon dioxide, helium, or similar inert gas. Gas generating systems for the air bag can include series produced propellants containing and oxidizing salt such as potassium nitrate, or a transition-metal oxide, such as copper oxide or iron oxide, and other ingredients such as sodium azide and sodium dioxide. The air bag can be constructed of any type of plastic material, such as nylon. The air bags of the present invention can be reusable and the gas sources can be replaceable. The child safety seat can also include restraining safety belts. The child safety seat of the present invention can be portable and can be constructed so that it may be plugged into any electronic and/or mechanical adapter in the car for the deployment of the airbags during a collision.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A child safety car-seat, comprising:
   a. a seat portion and a back portion;
   b. a crossbar rotatably attached to said seat portion and a crossbar attached rotatably to said back portion;
   c. said crossbars each having an air bag attached thereto; and
   d. said air bags being deployed outwardly from said crossbars away from said seat portion and said back portion when said air bags are filled with gas.

2. The child safety car-seat of claim 1 wherein said crossbars are positioned approximately in the center region of said air bags when said air bags are deployed.

3. The child safety car-seat of claim 2 wherein said air bags engulf said crossbars when said air bags are deployed.

4. The child safety car-seat of claim 1 wherein said crossbar attached to said back portion is approximately level with a child's chest when the child is in place in said car seat, and said crossbar attached to said seat portion is approximately at the level of the middle abdomen of a child in place in said car seat.

5. The child safety car-seat of claim 4 wherein each of said crossbars has a padded portion, said air bag being contained in a compartment positioned centrally in said padded portion of said crossbar.

6. The child safety car-seat of claim 4 wherein said crossbars are positioned approximately in the center region of said air bags when said air bags are deployed.

7. The child safety car-seat of claim 6 wherein said air bags engulf said crossbars when said air bags are deployed.

8. The child safety car-seat of claim 1 wherein each of said crossbars has a padded portion, said air bag being contained in a compartment positioned centrally in said padded portion of said crossbar.

9. A child safety car-seat, comprising:
   a. a seat portion and a back portion;
   b. a crossbar rotatably attached to said seat portion and a crossbar attached rotatably to said back portion;
   c. said crossbars each having an air bag attached thereto;
   d. said air bags being deployed outwardly from said crossbars away from said seat portion and said back portion when said air bags are filled with gas;
   e. said crossbar attached to said back portion being approximately level with a child's chest when the child is in place in said car-seat, and said crossbar attached to said seat portion being approximately at the level of the middle abdomen of the child in place in said car seat; and
   f. each of said crossbars having a padded portion, said air bag being contained in a compartment positioned centrally in said padded portion of said crossbar.

10. The child safety car-seat of claim 9 wherein said crossbars are positioned approximately in the center region of said air bags when said air bags are deployed.

11. The child safety car-seat of claim 10 wherein said air bags engulf said crossbars when said air bags are deployed.

* * * * *